(12) United States Patent  (10) Patent No.: US 9,298,018 B2
Farnam  (45) Date of Patent: Mar. 29, 2016

(54) EYEWEAR WITH LENS RETENTION FEATURE AND METHOD OF MANUFACTURE

(71) Applicant: Dolby Laboratories Licensing Corporation, San Francisco, CA (US)

(72) Inventor: Julian Farnam, Livermore, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 131 days.

(21) Appl. No.: 14/103,609

(22) Filed: Dec. 11, 2013

(65) Prior Publication Data

US 2014/0185001 A1 Jul. 3, 2014

Related U.S. Application Data

(60) Provisional application No. 61/746,781, filed on Dec. 28, 2012.

(51) Int. Cl.
*G02C 5/14* (2006.01)
*G02C 1/08* (2006.01)

(52) U.S. Cl.
CPC *G02C 5/146* (2013.01); *G02C 1/08* (2013.01); *G02C 2200/08* (2013.01)

(58) Field of Classification Search
CPC .............. G02C 5/006; G02C 2200/06; G02C 2200/18; G02C 1/06; G02C 1/08; G02C 5/20; G02C 5/008; G02C 5/146
USPC ......... 359/86, 89, 90, 91, 93, 95, 96, 98–101, 359/103, 116
See application file for complete search history.

(56) References Cited

U.S. PATENT DOCUMENTS

| | | | |
|---|---|---|---|
| 1,308,344 A | 11/1884 | Collins | |
| 1,272,833 A | 7/1918 | Metcalf | |
| 1,922,766 A | 8/1933 | Hurwitz | |
| 2,551,144 A | 5/1951 | Lindemann | |
| 3,762,804 A | 10/1973 | Livas | |
| 3,801,189 A | 4/1974 | Bolle | |
| 4,017,165 A | 4/1977 | Davis | |
| 4,488,792 A | 12/1984 | Wagner | |
| 4,813,775 A | 3/1989 | Kaksonen | |
| 5,500,694 A | 3/1996 | Roever | |
| 5,523,806 A | 6/1996 | Sakai | |
| 5,682,221 A | 10/1997 | Dittmeier | |
| 5,726,732 A | 3/1998 | Kobayashi | |
| 6,099,118 A | 8/2000 | Hwang | |
| 6,276,796 B1 | 8/2001 | Lindberg | |
| 6,890,073 B2 | 5/2005 | DiChiara | |
| 7,100,215 B2 * | 9/2006 | Shiue | 2/443 |
| 7,137,700 B2 | 11/2006 | DiChiara | |
| 8,182,086 B2 | 5/2012 | Cheong | |
| 2013/0114038 A1 * | 5/2013 | Huang | 351/116 |

* cited by examiner

*Primary Examiner* — Darryl J Collins
*Assistant Examiner* — Journey Sumlar

(57) ABSTRACT

Eyewear includes a set of lenses, a frame, and a pair of arms. A primary attachment feature facilitates attachment of the arms to the frames. A secondary attachment feature facilitates attachment of the arms to the frames in case the primary attachment feature becomes partially or wholly dysfunctional. A concealment feature at least partially conceals the secondary attachment feature. The concealment feature is detachable to permit use of the secondary attachment feature. In an example embodiment, the concealment feature is formed as an integral breakaway component of the arms.

23 Claims, 9 Drawing Sheets

EYEWEAR WITH LENS RETENTION FEATURE AND METHOD OF MANUFACTURE

CROSS REFERENCE TO RELATED APPLICATIONS

This application claims the benefit of U.S. Provisional Application No. 61/746,781 filed Dec. 28, 2012, which is hereby incorporated by reference in its entirety.

BACKGROUND OF THE INVENTION

1. Field of the Invention

This invention relates generally to eyewear, and more particularly to eyewear for viewing video presentations.

2. Description of the Background Art

Some modern video presentations (e.g., 3-D movies) require special eyewear to be viewed properly. In the past, this type of eyewear was designed for minimal manufacturing costs with little regard for aesthetics. Recently, however, more design emphasis has been put into giving such eyewear a more quality appearance. Indeed, manufacturers strive to achieve an eyewear design with a good balance between performance, aesthetics, and low cost of manufacturing.

Such eyewear typically includes a set of lenses, a set of arms, and a frame. Typically, the lenses are permanently mounted in the frame by some suitable means such as, for example, glue, thermal weld, molding the frame around the lens, etc. The arms and the frame are typically integral parts of a single component formed, for example, via injection molding or the like. Indeed, such eyewear is typically a single disposable device wherein the lenses, arms, and frame are permanent integral parts thereof.

Although current eyewear designs achieve a good balance between performance, aesthetics, and low cost of manufacturing, they also have disadvantages. For example, if any one or more of the integral parts of the eyewear does not function properly, the entire eyewear has to be disposed of because all the components are permanently coupled together. Of course, disposing of the entire eyewear when only a single component is defective is wasteful and, therefore, undesirable. Furthermore, the eyewear is not personally customizable or adapted for retrofitting.

In an attempt to address the problems associated with the prior art, some eyewear is designed such that the arms are detachable and, therefore, can be replaced if necessary. Typically, such designs include arms having a mounting feature (e.g. hinge pin) that is adapted to engage a complementary mounting feature (e.g. hinge pin receiving aperture) formed on the frame.

Although eyewear having removable arms alleviates some of the challenges associated with eyewear having integral arms, disadvantages still exist. For example, the mounting feature formed on the arms and the complementary mounting feature formed on the frame are inherently susceptible to fatigue and eventual failure. Typically, once the mounting feature wears out, the arm has to be replaced. Likewise, when the complementary mounting feature wears out, the frame typically has to be replaced.

What is needed, therefore, is eyewear that is more salvageable when one or more components fail. What is also needed is eyewear that is personally customizable with interchangeable parts. What is also need is eyewear that is more adapted for retrofitting.

SUMMARY

The present invention overcomes the problems associated with the prior art by providing eyewear with multiple means for attaching arms of the eyewear to a frame of the eyewear. The invention also provides a unique means of attaching the arms of the eyewear to the frame of the eyewear.

In an example embodiment, eyewear includes at least one lens, a frame adapted to receive and support the lens, and at least one arm. A primary attachment feature is adapted to attach the arm to the frame. A secondary attachment feature is also adapted to attach the arm to the frame. When the primary attachment feature is in good condition, it is sufficient to attach the arm to the frame without using the secondary attachment feature.

In the example embodiment, the primary attachment feature includes a snap structure, and the secondary attachment feature includes a fastener (e.g., a threaded fastener). In the particular example, the primary attachment feature includes a projection extending from the frame and an opening formed in the arm. The opening is adapted to receive the projection, and the projection is adapted to snap into the opening. A retaining feature retains the projection in the opening.

An example frame includes an upper part for engaging an upper portion of the lens and a lower part for engaging a lower portion of the lens. The upper part of the frame is moveable with respect to the lower part of the frame when the projection is not disposed in the opening. The projection includes a first portion formed on the upper part of the frame and a second portion formed on the lower part of the frame. The first portion of the projection is moveable with respect to the second portion of the projection. The upper part of the frame is fixed with respect to the lower part of the frame when the projection is disposed in the opening. Thus disposed, the lens is clamped between the upper part of the frame and the lower part of the frame, which are held in place by the opening in the arm. Optionally, the arm is a unitary rigid structure, and the opening is formed through the rigid structure.

An example of the secondary attachment feature includes a first fastener engaging feature (e.g., a countersunk screw hole) formed in the arm and a second fastener engaging feature (e.g., a threaded hole) formed in the frame.

A concealment feature at least partially conceals the secondary attachment feature when the secondary attachment feature is not in use. In the disclosed embodiment, the concealment feature is detachable to permit use of the secondary attachment feature. Optionally, the concealment feature resembles at least a portion of the secondary attachment feature. For example, at least a portion of the concealment feature is formed in the shape of a screw head, which also facilitates removal of the concealment feature. In a disclosed embodiment, the arm is a unitary rigid structure, and the concealment feature is formed as an integral part of the arm.

A method for manufacturing eyewear is also disclosed. An example method includes providing a lens, providing a frame, providing an arm, providing a primary attachment feature for attaching the arm to the frame, and providing a secondary attachment feature for attaching the arm to the frame. The lens is mounted in the frame, and the arm is initially attached to the frame using only the primary attachment feature. Subsequently, the arm (or other arms) is/are repeatedly detached and reattached to the frame via the primary attachment feature. The method further includes attaching an arm to the frame via the secondary attachment feature only after the step of repeatedly detaching and reattaching arms to the frame via the primary attachment feature (e.g., when the primary attachment feature wears out).

The structural design of the example embodiment advantageously permits manufacture by injection molding. Therefore, the step of providing the arm can include forming the arm via injection molding, and the step of providing the frame can include forming the frame via injection molding.

Another aspect of the invention is the provision of eyewear that includes a lens, an arm that is a rigid unitary body defining an opening, and a frame. The frame includes a bifurcated lens receiver that opens to receive the lens and fixes the lens within the lens receiver when a portion of the lens receiver is disposed within the opening.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing eyewear having detachable arms and break-out features for optionally coupling the arms to the frame via screws. In the following description, numerous specific details are set forth (e.g., lens types, material types, etc.) in order to provide a thorough understanding of the invention. Those skilled in the art will recognize, however, that the invention may be practiced apart from these specific details. In other instances, details of well-known manufacturing practices (e.g. injection molding) and components have been omitted, so as not to unnecessarily obscure the present invention.

Figure 1:
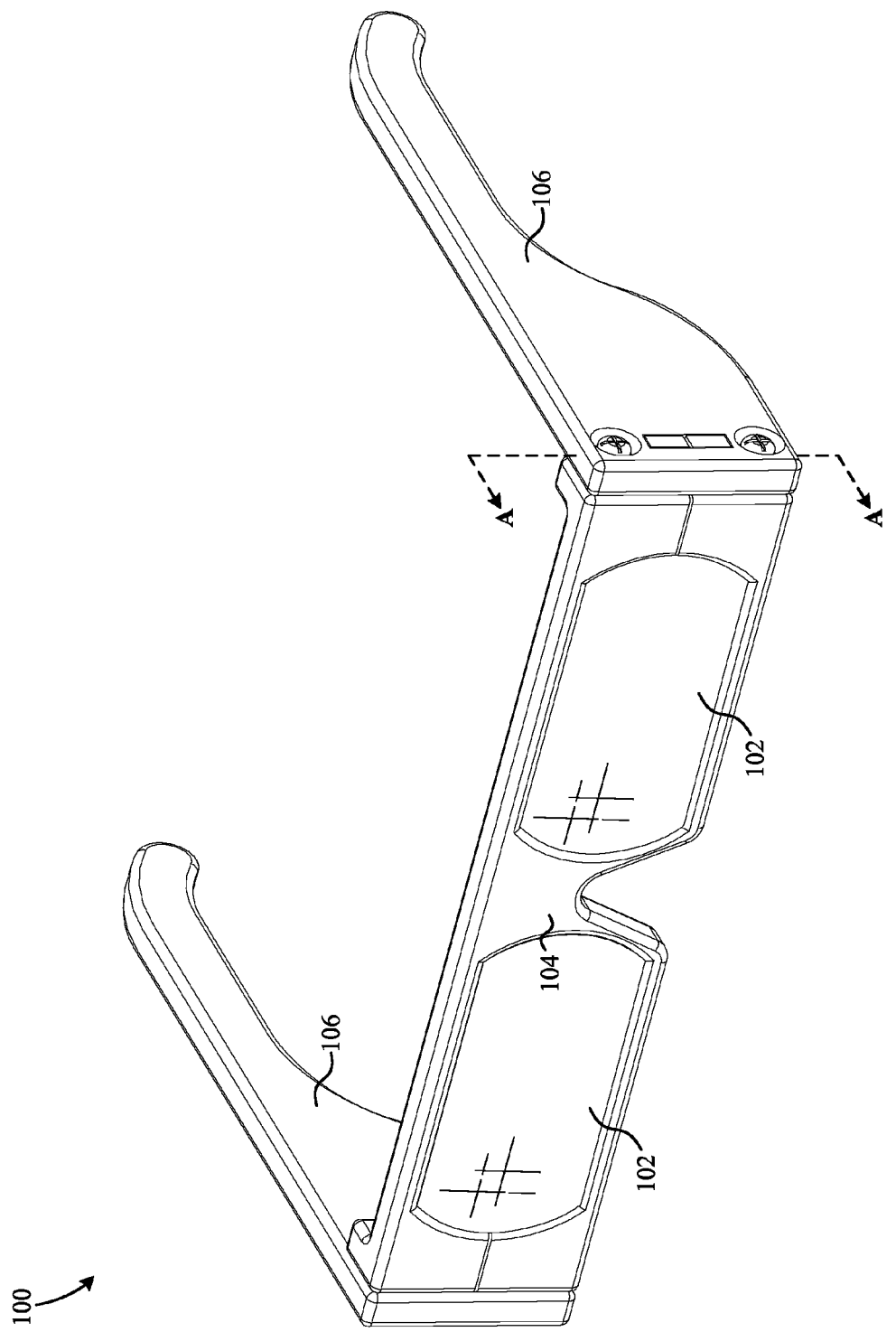
FIG. 1 is a perspective view of eyewear according to one embodiment of the present invention.

FIG. 1 is a perspective view of assembled eyewear 100. Eyewear 100 includes a set of lenses 102, a frame 104, and a set of arms 106 (temple pieces). Lenses 102 are mounted in frame 104 and arms 106 are snap-fit mounted on opposite sides of frame 104. In the assembled state, lenses 102 are retained in frame 104, and the positions of arms 106 are fixed with respect to frame 104. In this example embodiment, eyewear 100 is of the type used for viewing 3D video presentations. However, those skilled in the art will recognize that the invention is not necessarily limited to 3D video eyewear. Rather, the inventive features of eyewear 100 can be applied to any suitable type of eyewear including, but not limited to, sun shades, reading glasses, safety glasses, etc.

Figure 2:
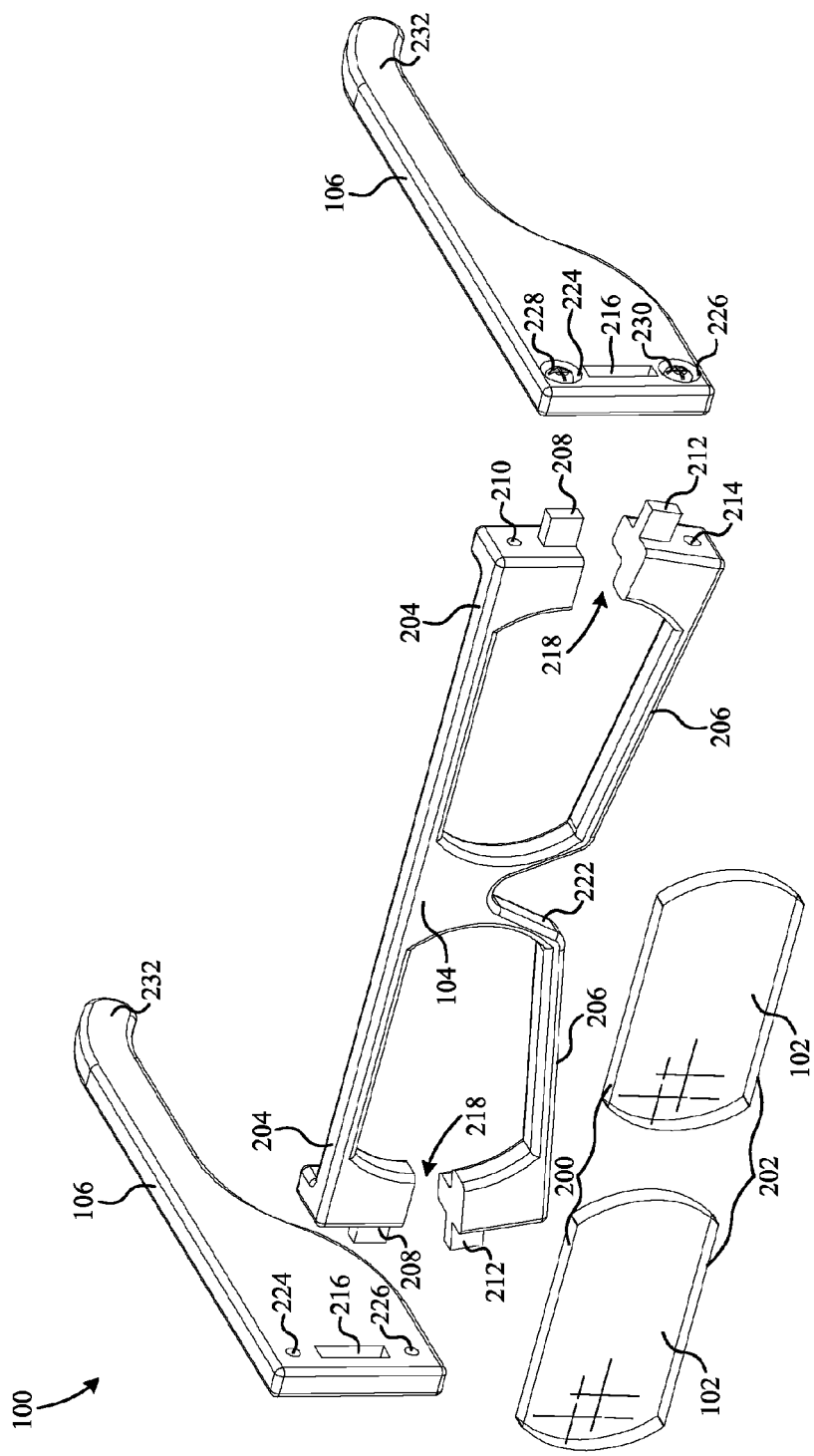
FIG. 2 is a perspective view of the eyewear of FIG. 1 disassembled.

FIG. 2 is a perspective view of eyewear 100 showing lenses 102, frame 104, and arms 106 disassembled. That is, lenses 102 and arms 106 are shown detached from frame 104.

Lenses 102 are 3D lenses (e.g., polarization filter type, dichroic filter type, etc.), each having a top peripheral region 200 and a bottom peripheral region 202 that are adapted to engage frame 104.

Frame 104 is adapted to support and retain lenses 102 and includes both a top portion 204 and a bottom portion 206. Top portion 204 and bottom portion 206 of frame 104 are adapted to engage top peripheral regions 200 and bottom peripheral regions 202, respectively, of lenses 102. Each side of top portion 204 defines a protrusion 208 and a screw hole 210. Likewise, each side of bottom portion 206 defines a protrusion 212 and a screw hole 214.

Protrusions 208 and 212, together, facilitate the securing of lenses 102 into frame 104 and the mounting of arms 106 to frame 104. In particular, a separation 218 exists on each side of frame 104 between top portion 204 and bottom portion 206, which allows the deflection of bottom portions 206 away from top portions 208, so that lenses 102 can be inserted into frame 104. Protrusions 208 and 212 are adapted to snap-fit (after being squeezed together) into apertures 216, which are formed through each of arms 106. Screw holes 210 and 214 provide an optional means for attaching arms 106 to frame 104 via screws 220 (shown in FIG. 3C). Bottom portion 206 of frame 104 additionally defines a nose rest 222 to facilitate resting eyewear 100 on the nose of a wearer. The distal ends 232 of arms 106 are adapted (e.g., hooked) to engage the ears of a wearer to prevent eyewear 100 from slipping forward and down the wearer's nose.

Each of arms 106 additionally includes a first countersunk screw hole 224 and a second countersunk screw hole 226, each of which includes a break-out feature 228 and 230, respectively, formed therein. Countersunk screw holes 224 and 226 are coaxially aligned with screw holes 210 and 214, respectively, of frame 104 when protrusions 208 and 212 are snapped into aperture 216. Each of break-out features 228 and 230 are shaped like a screw head and have an engaging feature to facilitate removal via a screw driver. When arms 106 are mounted to frame 104 by snap-fitting protrusions 208 and 212 into aperture 216, break-out features 228 and 230 are left in countersunk screw holes 224 and 226, respectively. However, if the snap-fitting features of protrusions 208 and 212 and apertures 216 become fatigued and no longer capable of securing arms 106 to frame 104, then break-out features 228 and 230 can to be removed so that screws can be used to fasten arms 106 to frame 104. Once break-out features 228 and 230 are removed, screws can be positioned in holes 224 and 226 and threaded into holes 210 and 214, respectively.

Prior to their removal, breakout features 228 and 230 serve at least two useful purposes. First, breakout features 228 and 230 are decorative in nature, giving the appearance of a screw head within countersunk screw holes 224 and 226. In addition, breakout features 228 and 230 prevent debris collecting in and/or damage occurring to screw holes 210 and 214.

Eyewear 100 is assembled as follows. First, one of lenses 102 is positioned between top portion 204 and bottom portion 206 on one side of frame 104. Then, with lens 102 in place, top portion 204 and bottom portion 206 are urged toward one another thus clamping lens 102 therebetween. With lens 102 clamped between top portion 204 and bottom portion 206, protrusions 208 and 212 (on the associated side of frame 104) are snapped into aperture 216 of arm 106. By snapping protrusions 208 and 212 into aperture 216, top portion 204 and bottom portion 206 are held together with lens 102 mounted therebetween. After mounting one of lenses 102 and one of arms 106, the same process is repeated to mount the remaining one of lenses 102 and arms 106 on the opposite side of eyewear 100.

Figure 3A:
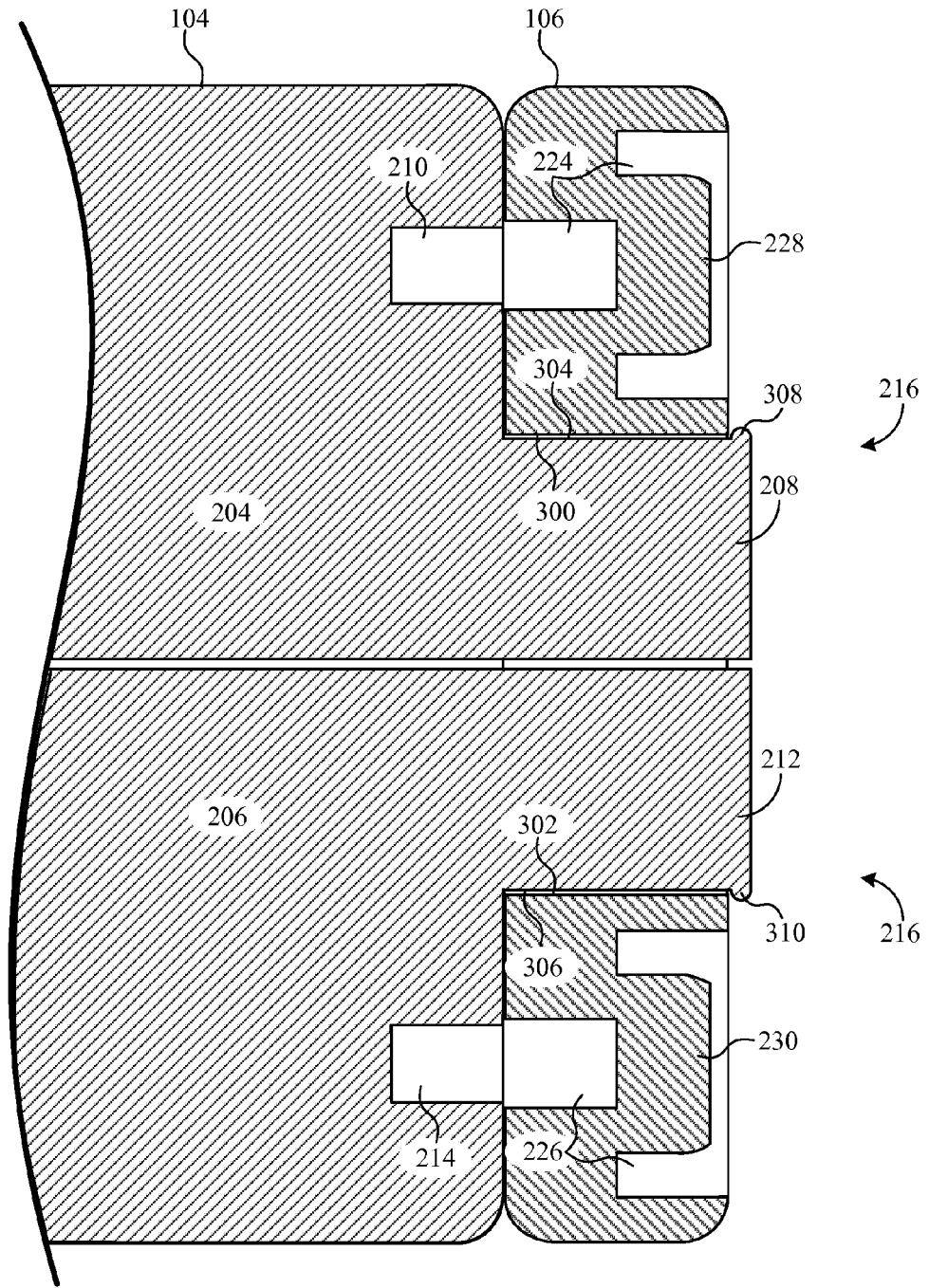
FIG. 3A is a cross sectional view of the eyewear of FIG. 1, taken along line A-A, showing the arms and frame of the eyewear snap-fit coupled to one another.

FIG. 3A is a cross-sectional view, taken along line A-A of FIG. 1, of frame 104 snap-fit mounted to arm 106. In this particular embodiment, screws are not used to mount arms 106 to frame 104. Therefore, break-out features 228 remain connected to arm 106, and screw holes 210, 214, 224, and 226 are unused. In other words, arms 106 are connected to frame 104 by means of a primary attachment feature (protrusions 208 and 212 and apertures 216), and the optional secondary attachment feature (screw holes 210, 214 and countersunk screw holes 224, 226) is not used. When unused, the secondary attachment feature does not include the actual fastener (e.g., the screws). Rather, the unused secondary attachment feature includes only the fastener engaging structures (screw holes 210, 214 and countersunk screw holes 224, 226) of frame 104 and arm 106, even though those fastener engaging structures do not attach to each other without a fastener. When used, the secondary attachment feature does include the fastener.

Top portion 204 and bottom portion 206 have a natural tendency to deflect away from one another but are prevented from doing so by aperture 216. Aperture 216 is defined in-part by a downward facing surface 300 and an opposite upward facing surface 302. Top portion 204 and bottom portion 206 of frame 104 define an upward facing surface 304 and a downward facing surface 306, respectively. As shown, downward facing surface 300 of arm 106 abuts upward facing surface 304 of top region 104 to prevent further upward deflection thereof. Similarly, upward facing surface 302 of arm 106 abuts downward facing surface 306 of bottom portion 206 to prevent further downward deflection thereof. Each of protrusions 208 and 212 include a lip 308 and 310, respectively, that secure arm 106 to frame 104. In particular, protrusion 208, protrusion 212, and aperture 216 function as a retaining feature by holding top portion 204 and bottom portion 206 in a clamped position around lenses 102 and also for securing arm 106 to frame 104. Lip 308 and lip 310 prevent protrusion 208 and protrusion 212, respectively, from slipping out of aperture 216.

Figure 3B:
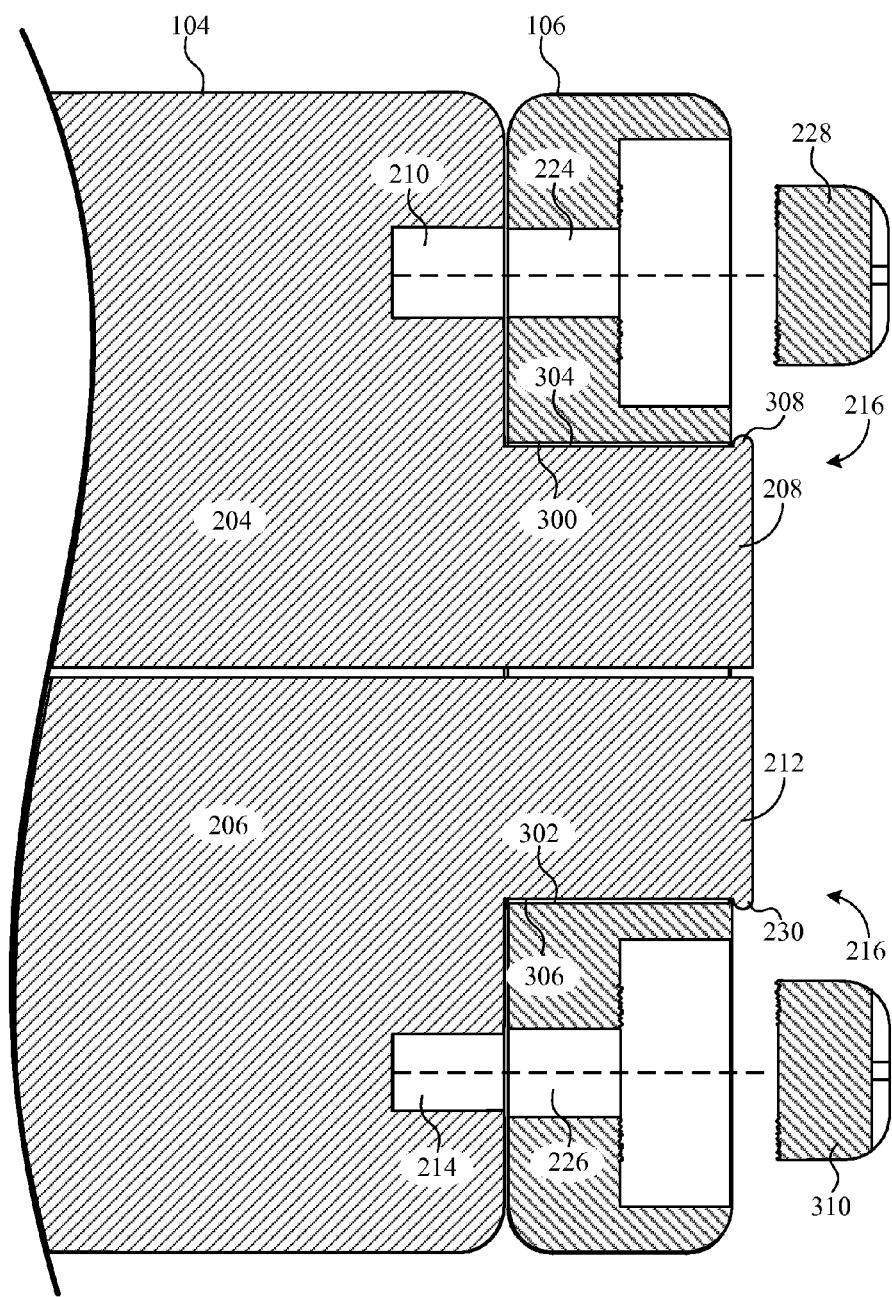
FIG. 3B is a cross sectional view of the eyewear of FIG. 1, taken along line A-A, showing the removal of break-out features from the arms of the eyewear.

FIG. 3B is a cross-sectional view, taken along line A-A of FIG. 1, of arm 106, illustrating the removal of break-out features 228, in preparation for the optional mounting of arms 106 to frame 104 via screws. As shown, the removal of break-out features 228 provides access to screw holes 210 and 214. Once removed, break-out features 228 can be discarded.

Figure 3C:
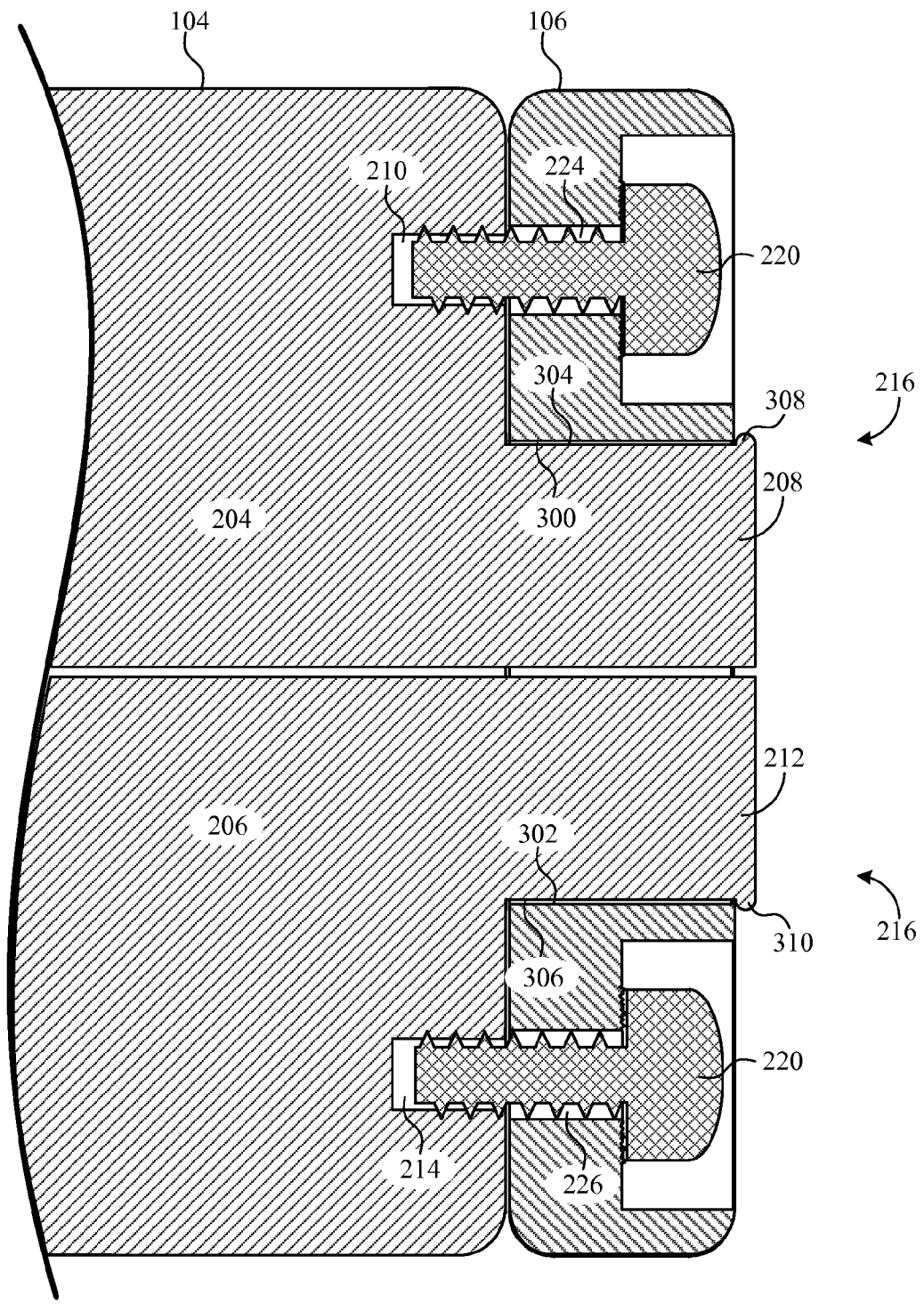
FIG. 3C is a cross sectional view of the eyewear of FIG. 1, taken along line A-A, showing the arms and frame of the eyewear coupled to one another via screws.

FIG. 3C is a cross-sectional view, taken along line A-A of FIG. 1, showing arm 106 mounted to frame 104 via screws 220. As shown, one of screws 220 is coaxially aligned with, and disposed in, countersunk screw hole 224 and screw hole 210. Likewise, the other of screws 220 is coaxially aligned with, and disposed in, countersunk screw hole 226 and screw hole 214.

There are several instances where it may be desirable to use screws to attach arms 106 to frame 104. For example, lips 308 and 310 may become worn over time and no longer capable of retaining protrusions 208 and 212 in aperture 216. As another example, frame 104 may become fatigued over time such that top portion 204 and bottom portion 206 lose the tendency to deflect away from one another. As yet another example, a wearer of eyewear 100 may simply prefer the added reinforcement screws 220 provide. In any case, the optional secondary attachment feature extends the useful life of eyewear 100.

Figure 4:
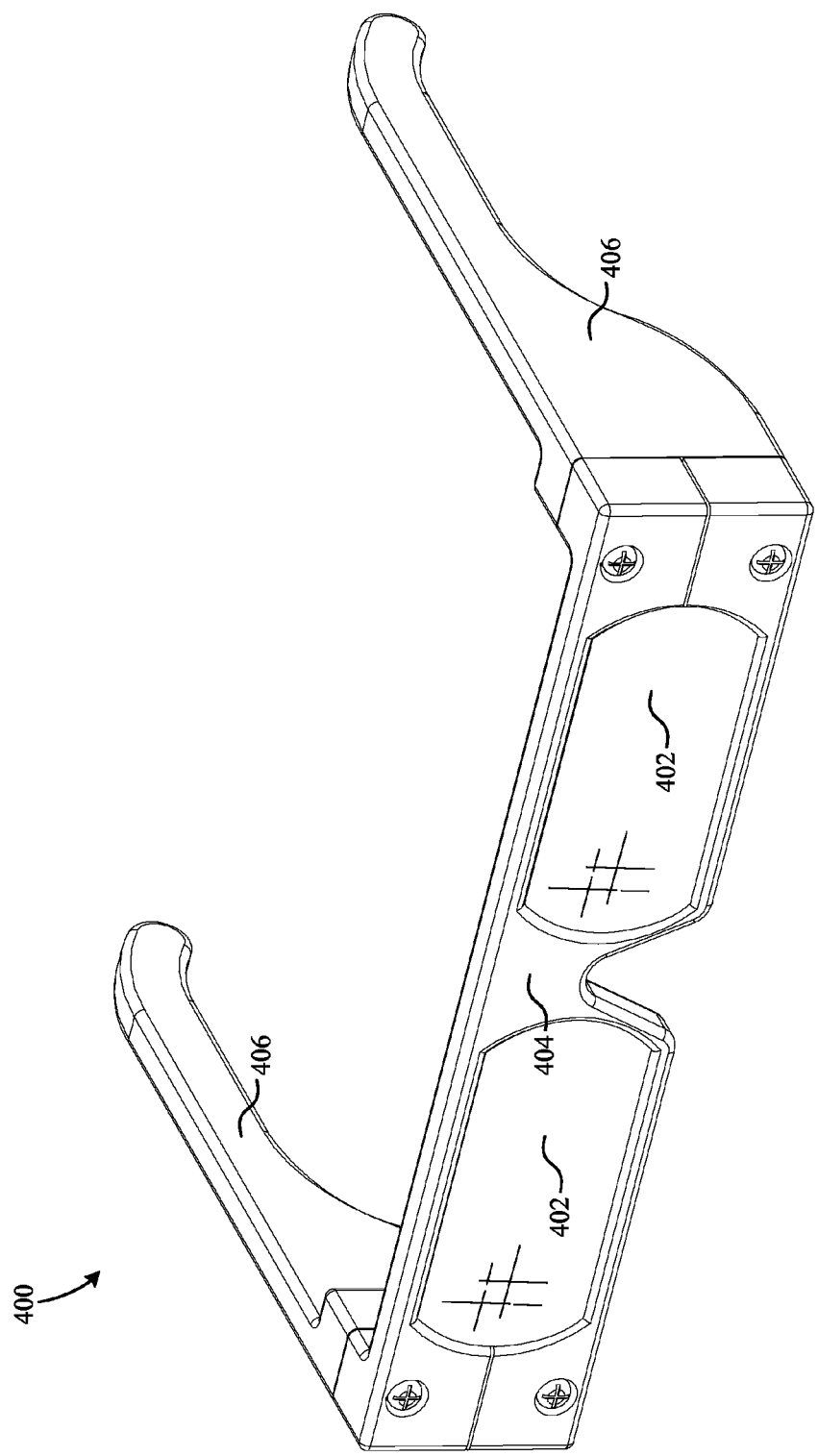
FIG. 4 is a front perspective view of eyewear according to one embodiment of the present invention.

FIG. 4 is a front perspective view of eyewear 400 according to an alternative embodiment of the present invention. Eyewear 400 includes a set of lenses 402, a frame 404, and a set of arms 406 (temple pieces). Lenses 402 are mounted in frame 404 and arms 406 are snap-fit mounted on opposite sides of frame 404. In the assembled state, lenses 402 are retained in frame 404, and the positions of arms 406 are fixed with respect to frame 404.

Figure 5:
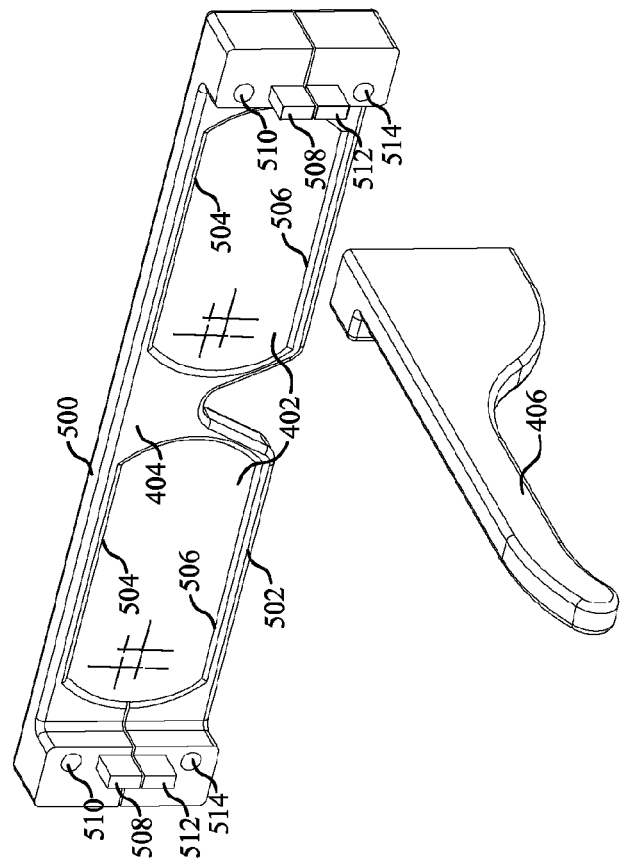
FIG. 5 is a rear perspective view of eyewear according to one embodiment of the present invention.
Figure 5:
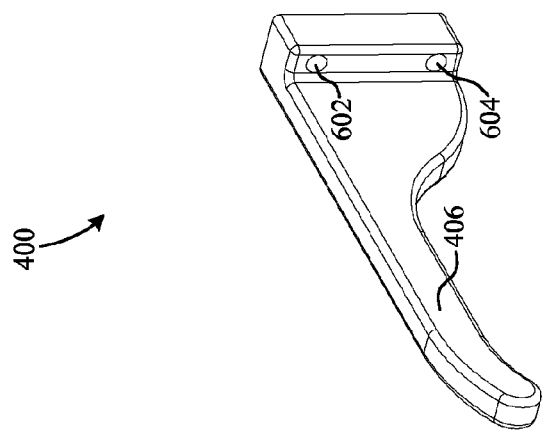

FIG. 5 is a rear perspective view of eyewear 400, wherein arms 406 are shown removed from frame 404. Frame 404 is adapted to support and retain lenses 402 and includes both a top portion 500 and a bottom portion 502. Top portion 500 and bottom portion 502 of frame 404 are adapted to engage top peripheral regions 504 and bottom peripheral regions 506, respectively, of lenses 402. Each side of top portion 500 defines a protrusion 508 and a screw hole 510. Likewise, each side of bottom portion 502 defines a protrusion 512 and a screw hole 514. Protrusions 508 and 512 are part of a primary attachment feature for mounting arms 406 to frame 404. Screw holes 510 and 514 are part of a secondary attachment feature for mounting arms 406 to frame 404. Arms 406 can be mounted to frame 404 by the primary attachment feature and/or the secondary attachment feature. Optionally, the secondary attachment feature can remain unused and be at least partially concealed.

Figure 6:
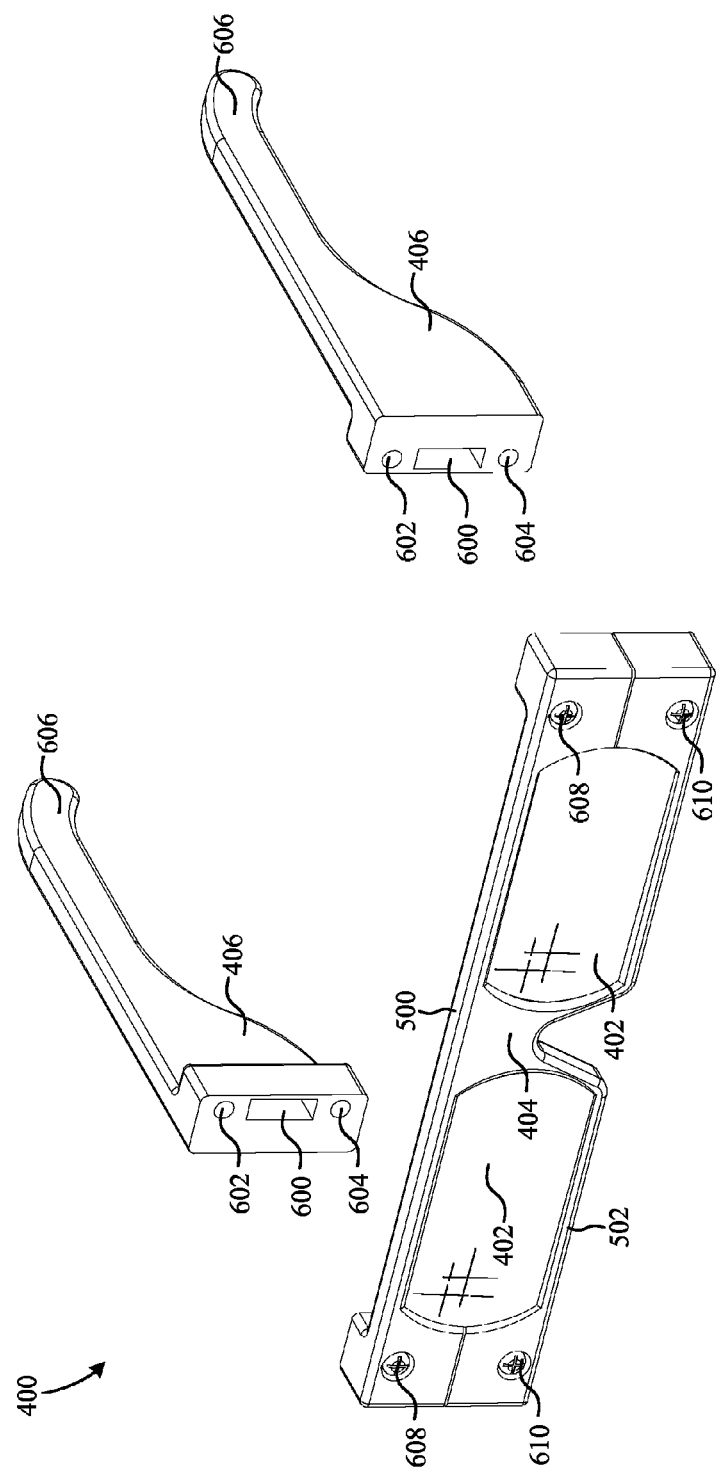
FIG. 6 is a front perspective view of eyewear according to one embodiment of the present invention.

FIG. 6 is a front perspective view of eyewear 400 wherein arms 406 are shown removed from frame 404. As shown, each of arms 406 includes a receiver 600, a top screw hole 602, a bottom screw hole 604, and a hooked distal end 606. Receiver 600 is adapted to receive protrusions 508 and 512. That is, protrusions 508 and 512 snap-fit into receiver 600, thereby providing the primary attachment feature for mounting arms 406 to frame 404. Screw holes 602 and 604 are coaxially aligned with screw holes 510 and 514, respectively, to facilitate fastening arms 406 to frame 404 with screws. Of course, fastening arms 406 to frame 404 with screws requires first removing break out features 608 and 610 from holes 510 and 514, respectively. Unlike break-out features 228 and 230 of eyewear 100, break out features 608 and 610 of eyewear 400 are located on frame 404. Thus, the unused secondary attachment feature is at least partially concealed and does not include the fastening screws.

Figure 7:
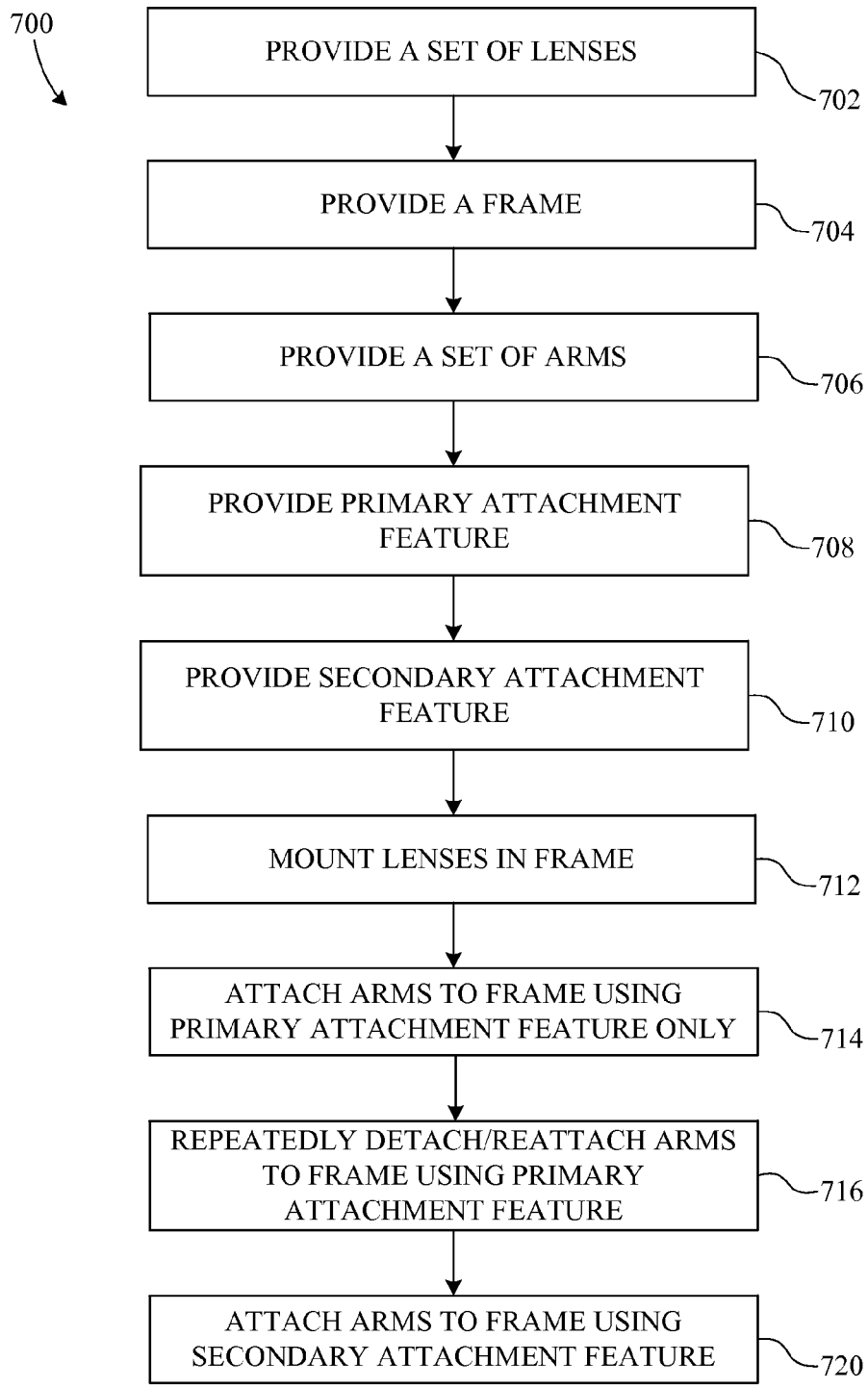
FIG. 7 is a flow chart summarizing one method for manufacturing eyewear according to one embodiment of the present invention.

FIG. 7 is a flow chart summarizing one method 700 for manufacturing eyewear according to one embodiment of the present invention. In a first step 702, a set of lenses is provided. Then, in a second step 704, a frame is provided. Next, in a third step 706, a set of arms is provided. Then, in a fourth step 708, a primary attachment feature is provided, which might include integral parts of the frame and/or the arms. Next, in a fifth step 710, a secondary attachment feature is provided. Then, in a sixth step 712, the lens(es) is/are mounted in the frame. Next, in a seventh step 714, the arms are attached to the frame via the primary attachment feature. Then, in an eighth step 716, arms are repeatedly detached and reattached to the frame using the primary attachment feature. Finally, in a ninth step 718, arms are attached to the frame using the secondary attachment feature.

The description of particular embodiments of the present invention is now complete. Many of the described features may be substituted, altered or omitted without departing from the scope of the invention. For example, alternate lens types (e.g., transparent lenses, prescription lenses, polarized lenses, shaded lenses, color filter lenses, etc.), may be substituted for 3D lenses 102. As another example, alternate screw heads (e.g., flat-head, hex-head, square-head, etc.) may be defined by break-out features 224 and 226. These and other deviations from the particular embodiments shown will be apparent to those skilled in the art, particularly in view of the foregoing disclosure.

I claim:

1. Eyewear comprising:
   at least one lens;
   a frame adapted to receive and support said at least one lens;
   at least one arm;
   a primary attachment feature adapted to attach said arm to said frame; and
   a secondary attachment feature different from said primary attachment feature and being adapted to attach said arm to said frame,
   wherein said secondary attachment feature includes a fastener receiving structure, said at least one arm is coupled to said frame using one or the other of said primary attachment feature and said secondary attachment feature, and said fastener receiving structure is at least partially concealed.

2. The eyewear of claim 1, wherein said primary attachment feature includes a snap structure.

3. The eyewear of claim 1, further comprising a fastener engaging said fastener receiving structure.

4. The eyewear of claim 3, wherein said fastener is a threaded fastener.

5. The eyewear of claim 1, wherein said secondary attachment feature includes a threaded fastener.

6. The eyewear of claim 1, wherein said primary attachment feature includes:
   a projection extending from said frame; and
   an opening formed in said arm and being adapted to receive said projection.

7. The eyewear of claim 6, further comprising a retaining feature operative to retain said projection in said opening.

8. The eyewear of claim 7, wherein said projection is adapted to snap into said opening.

9. The eyewear of claim 8, wherein:
   said frame includes an upper part for engaging an upper portion of said lens and a lower part for engaging a lower portion of said lens, said upper part of said frame being moveable with respect to said lower part of said frame when said projection is not disposed in said opening;
   said projection includes a first portion and a second portion, said first portion of said projection being moveable with respect to said second portion of said projection;
   said first portion of said projection is formed on said upper part of said frame;
   said second portion of said projection is formed on said lower part of said frame; and
   said upper part of said frame is fixed with respect to said lower part of said frame when said projection is disposed in said opening.

10. The eyewear of claim 9, wherein:
    said arm is a unitary rigid structure; and
    said opening is formed through said rigid structure.

11. The eyewear of claim 10, wherein said secondary attachment feature includes:
    a first fastener engaging feature formed in said arm; and
    a second fastener engaging feature formed in said frame.

12. The eyewear of claim 11, further comprising a concealment feature that at least partially conceals said secondary attachment feature when said secondary attachment feature is not in use.

13. The eyewear of claim 12, wherein said concealment feature is detachable to permit use of said secondary attachment feature.

14. The eyewear of claim 1, further comprising a concealment feature that at least partially conceals said secondary attachment feature when said secondary attachment feature is not in use.

15. The eyewear of claim 14, wherein said concealment feature resembles at least a portion of said secondary attachment feature.

16. The eyewear of claim 14, wherein said concealment feature is detachable to permit use of said secondary attachment feature.

17. The eyewear of claim 16, wherein at least a portion of said concealment feature is formed in the shape of a screw head to facilitate removal.

18. The eyewear of claim 14, wherein:
    said arm is a unitary rigid structure; and
    said concealment feature is formed as an integral part of said arm.

19. A method for manufacturing eyewear, said method comprising:
    providing a lens;
    providing a frame;
    providing an arm;
    providing a primary attachment feature for attaching said arm to said frame;
    providing a secondary attachment feature for attaching said arm to said frame, said secondary attachment feature being different from said primary attachment feature;
    mounting said lens in said frame;
    attaching said arm to said frame using said primary attachment feature;
    leaving said secondary attachment feature unused; and
    at least partially concealing said unused secondary attachment feature.

20. The method of claim 19, further comprising:
    detaching said arm from said frame; and
    reattaching said arm or another arm to said frame via said primary attachment feature.

21. The method of claim 19, further comprising repeatedly detaching and reattaching arms to said frame via said primary attachment feature.

22. The method of claim 21, further comprising attaching an arm to said frame via said secondary attachment feature only after said step of repeatedly detaching and reattaching arms to said frame via said primary attachment feature.

23. The method of claim 19, wherein:
    said step of providing said arm includes forming said arm via injection molding; and;
    said step of providing said frame includes forming said frame via injection molding.

* * * * *